(12) United States Patent
Kuwajima

(10) Patent No.: US 8,497,430 B2
(45) Date of Patent: Jul. 30, 2013

(54) DISPLAY DEVICE

(75) Inventor: Yuka Kuwajima, Mobara (JP)

(73) Assignees: Hitachi Displays, Ltd., Chiba (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 438 days.

(21) Appl. No.: 12/946,919

(22) Filed: Nov. 16, 2010

(65) Prior Publication Data

US 2011/0115731 A1    May 19, 2011

(30) Foreign Application Priority Data

Nov. 17, 2009    (JP) .................................. 2009-261961

(51) Int. Cl.
*H05K 1/00*    (2006.01)
(52) U.S. Cl.
USPC .......................................................... 174/250
(58) Field of Classification Search
USPC .............. 174/126.1, 250, 254, 259, 260–262, 174/350, 355; 361/277, 679.01, 679.02, 679.21, 361/679.37, 679.39, 803
See application file for complete search history.

(56) References Cited

U.S. PATENT DOCUMENTS

| 6,972,966 | B1 * | 12/2005 | Oishi et al. | 361/803 |
| 2006/0223346 | A1 * | 10/2006 | Fujii et al. | 439/76.2 |
| 2008/0007538 | A1 * | 1/2008 | Kotera et al. | 345/173 |

FOREIGN PATENT DOCUMENTS

JP    2008-083491    4/2008

* cited by examiner

*Primary Examiner* — Jeremy Norris
*Assistant Examiner* — Tremesha S Willis
(74) *Attorney, Agent, or Firm* — Antonelli, Terry, Stout & Kraus, LLP.

(57) ABSTRACT

A display device includes a display panel and a touch panel disposed so as to overlap with the display panel. The display panel is connected to a first flexible wiring board on which a plurality of first wirings are arranged. The touch panel is connected to a second flexible wiring board on which a plurality of second wirings are arranged. The plurality of second wirings of the second flexible wiring board are connected to second connection terminals. The plurality of first wirings of the first flexible wiring board are connected to first connection terminals. The first connection terminals and the second connection terminals are electrically connected to each other.

10 Claims, 5 Drawing Sheets

DISPLAY DEVICE

CROSS-REFERENCE TO RELATED APPLICATION

The present application claims priority from Japanese application JP2009-261961 filed on Nov. 17, 2009, the content of which is hereby incorporated by reference into this application.

BACKGROUND OF THE INVENTION

1. Field of the Invention

The present invention relates to a display device.

2. Description of the Related Art

Display devices having a structure in which a touch panel is superimposed on a display panel are known (see JP2008-83491A). A flexible wiring board is connected to the display panel, and a separate flexible wiring board is also connected to the touch panel. Interface terminals for connection to a circuit board are provided in each of the flexible wiring boards.

In the related art, since separate flexible wiring boards are connected to the display panel and the touch panel, when there is a shift in the positions of the display panel and the touch panel, there is also a shift in the positions of the interface terminals of the two flexible wiring boards. Therefore, it is difficult to connect the interface terminals of the two flexible wiring boards together to the connectors or probe pins of an inspection device.

SUMMARY OF THE INVENTION

The present invention aims to eliminate a shift of terminals electrically connected through separate flexible wiring boards.

(1) A touch panel-attached display device including a display panel and a touch panel disposed so as to overlap with the display panel, wherein the display panel is connected to a first flexible wiring board on which a plurality of first wirings are arranged, the touch panel is connected to a second flexible wiring board on which a plurality of second wirings are arranged, the plurality of second wirings of the second flexible wiring board are connected to second connection terminals, the plurality of first wirings of the first flexible wiring board are connected to first connection terminals, and the first connection terminals and the second connection terminals are electrically connected to each other. According to this invention, the first and second flexible wiring boards can be easily electrically connected to each other.

(2) The display device according to (1), wherein the spacing of the plurality of second wirings may be larger than the spacing of the plurality of first wirings, and the pad size of the second connection terminals may be larger than the pad size of the first connection terminals. In this case, the connection terminals of the first flexible wiring board and the connection terminals of the second flexible wiring board can be electrically connected to each other even when a small positional shift occurs.

(3) The display device according to (1), wherein the spacing of the plurality of first wirings may be larger than the spacing of the plurality of second wirings, and the pad size of the first connection terminals may be larger than the pad size of the second connection terminals. In this case, the connection terminals of the first flexible wiring board and the connection terminals of the second flexible wiring board can be electrically connected to each other even when a small positional shift occurs.

DETAILED DESCRIPTION OF THE INVENTION

Hereinafter, the embodiment of the present invention will be described with reference to the drawings. In the present embodiment, although a liquid crystal display device is described by way of an example of a display device, the present invention is not limited to this. The present invention can be applied to an organic electroluminescence display device, a plasma display device, a field emission display device, and the like.

Figure 1:
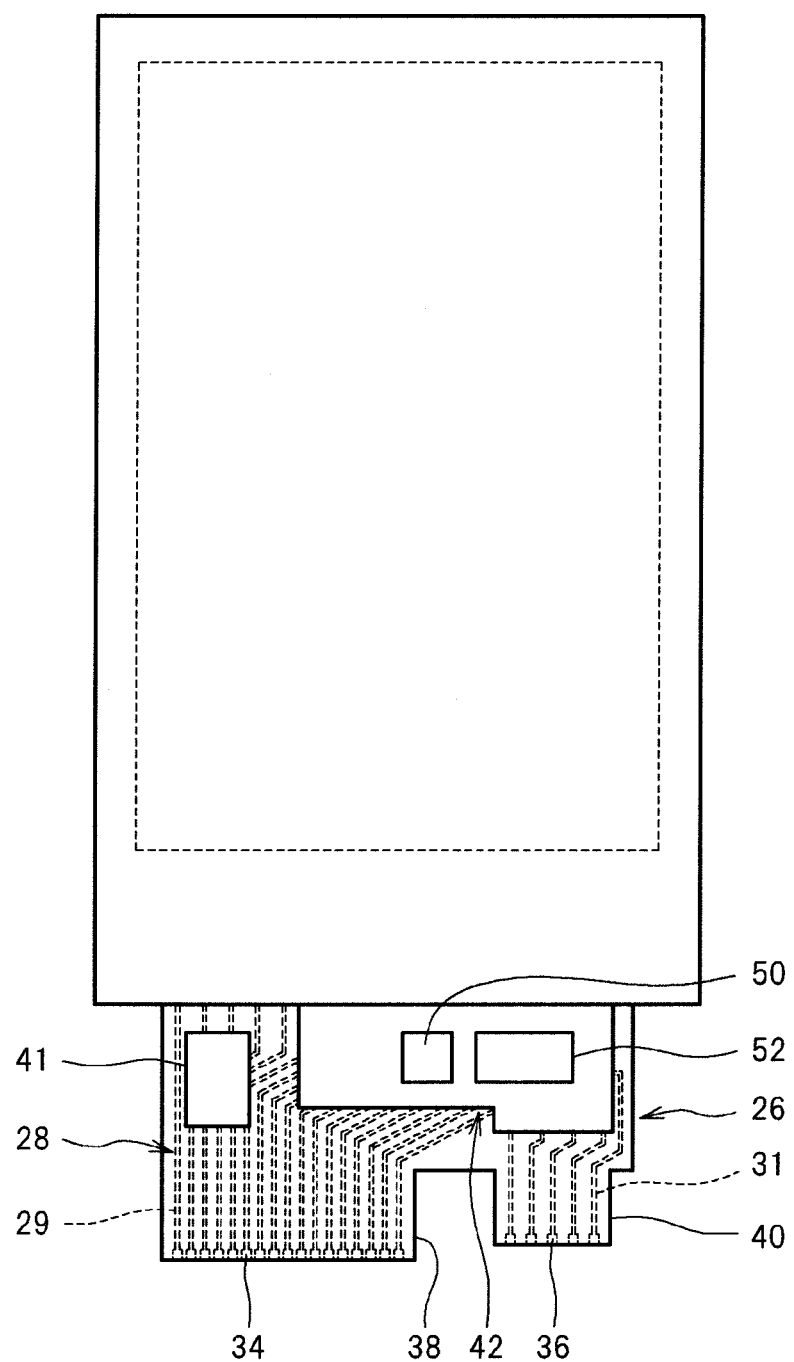
FIG. 1 is a top view showing a display device according to an embodiment of the present invention.
Figure 2:
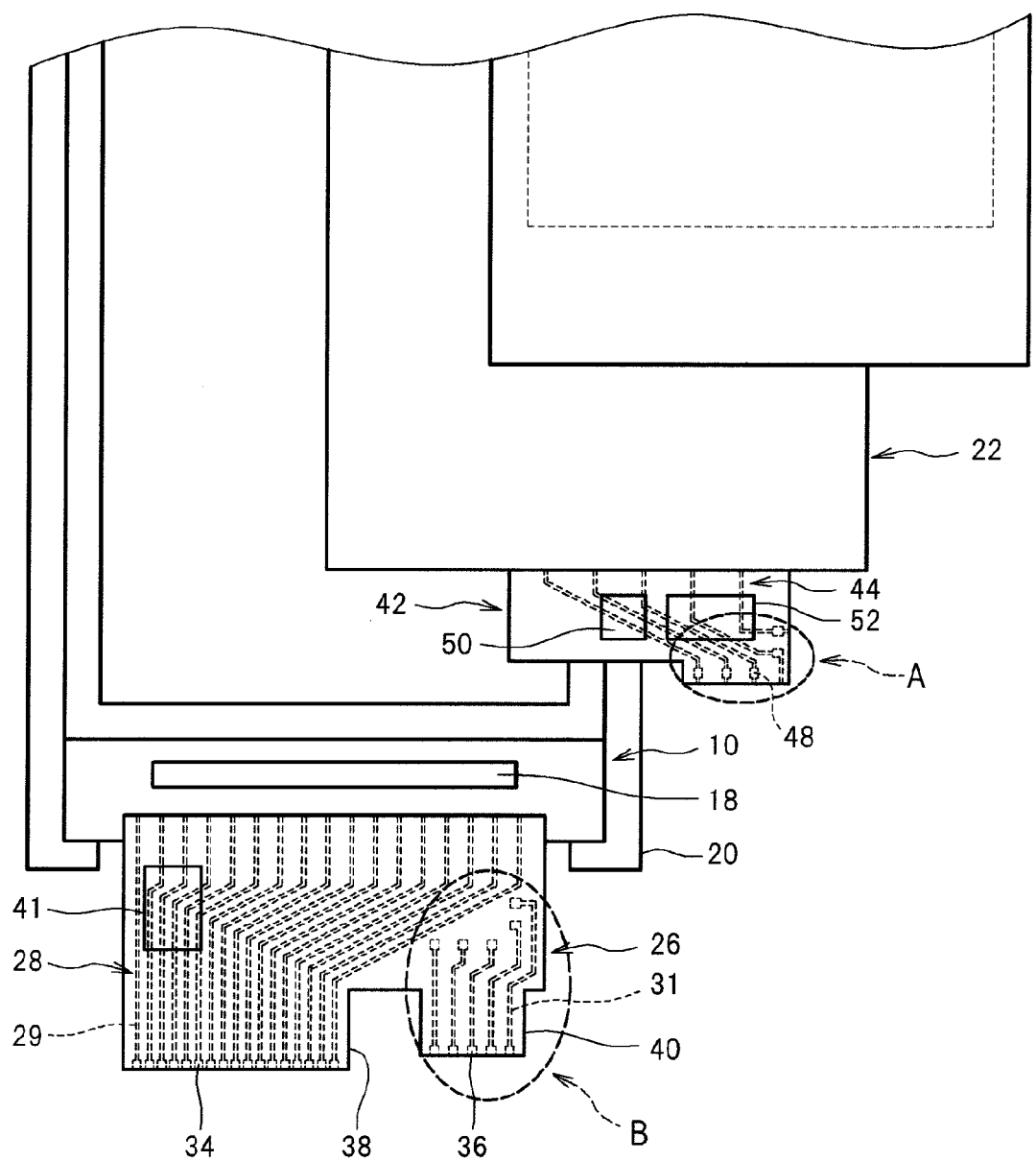
FIG. 2 is an exploded top view of the display device shown in FIG. 1.
Figure 3:
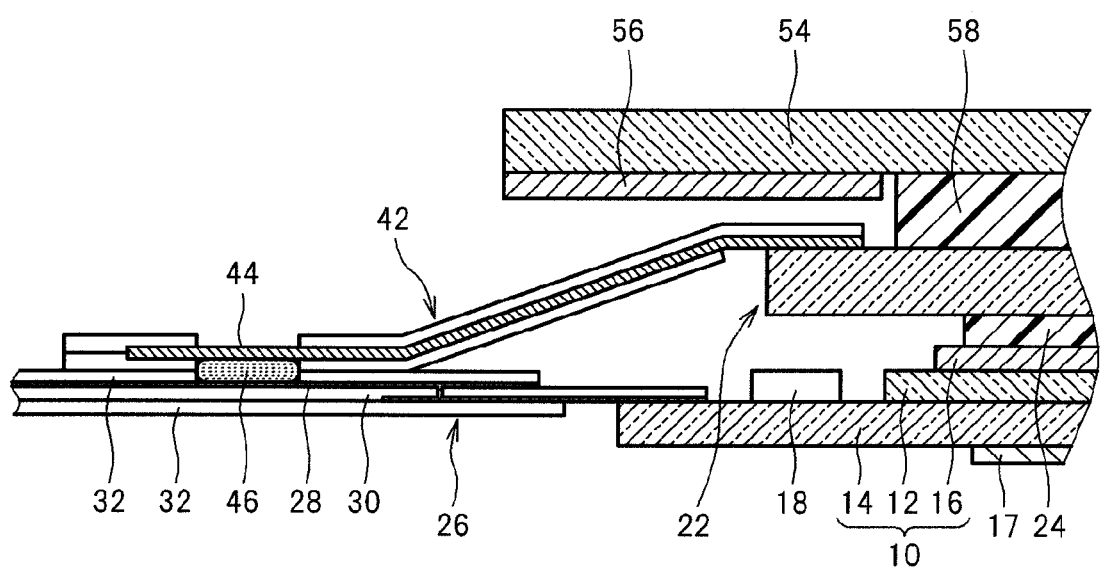
FIG. 3 is an enlarged cross-sectional view of a part of the display device shown in FIG. 1.

FIG. 1 is a top view showing a display device according to an embodiment of the present invention. FIG. 2 is an exploded top view of the display device shown in FIG. 1. FIG. 3 is an enlarged cross-sectional view of a part of the display device shown in FIG. 1.

As shown in FIG. 3, a display device includes a display panel 10. In the present embodiment, the display panel 10 is a liquid crystal display panel and includes a pair of substrates 12 and 14 (glass substrates) in which liquid crystals (not shown) are interposed between the two substrates. The driving mode of the liquid crystals may be any mode such as an IPS (In-Plane Switching) mode, a TN (Twisted Nematic) mode, or a VA (Vertical Alignment) mode, and electrodes and wirings are formed according to the mode. Polarizing plates 16 and 17 are attached to one substrate 12 and the other substrate 14, respectively. An integrated circuit chip 18 having a driver circuit for driving the liquid crystals therein is mounted on the peripheral portion of the other substrate 14. As shown in FIG. 2, the display panel 10 is supported on a frame 20. The frame 20 is made from a resin-molded product and is also called a mold.

As shown in FIG. 3, the display device includes a touch panel 22 (for example, an electrostatic capacitive coupling touch panel). The touch panel 22 is disposed so as to be superimposed on the display panel 10. The touch panel 22 and the display panel 10 are attached by an adhesion layer 24. Since the touch panel 22 is disposed on the display region of the display panel 10, a user can input instructions by touching an image on the display panel 10 with the user's finger.

The display device includes a first flexible wiring board 26 bonded to one of the display panel 10 and the touch panel 22 (in the present embodiment, the first flexible wiring board 26 is bonded to the display panel 10). The first flexible wiring board 26 includes third wirings 28. Specifically, as shown in FIG. 3, the third wirings 28 are formed on both surfaces of a base 30, and the surfaces of the third wirings 28, except a part thereof, are covered by a coating layer 32 such as a solder resist.

As shown in FIG. 1, a plurality of interface terminals 34 and a plurality of third connection terminals 36 are connected to the third wirings 28. In the present embodiment, the base 30 of the first flexible wiring board 26 includes two convex portions 38 and 40 in top view. The plurality of interface terminals 34 are formed on one convex portion 38, and the plurality of third connection terminals 36 are formed on the other convex portion 40.

The number of the plurality of interface terminals 34 is larger than the number of the plurality of third connection terminals 36. An electronic component 41 is mounted on the first flexible wiring board 26 so as to be electrically connected to the display panel 10 through the third wirings 28 (wirings 29 connected to the interface terminals 34).

As shown in FIGS. 2 and 3, the display device includes a second flexible wiring board 42 bonded to the other one of the display panel 10 and the touch panel 22 (in the present embodiment, the second flexible wiring board 42 is bonded to the touch panel 22). The second flexible wiring board 42 includes second wirings 44. The second flexible wiring board 42 has a portion which overlaps with the first flexible wiring board 26. Moreover, the second flexible wiring board 42 is bonded to the first flexible wiring board 26.

Figure 4:
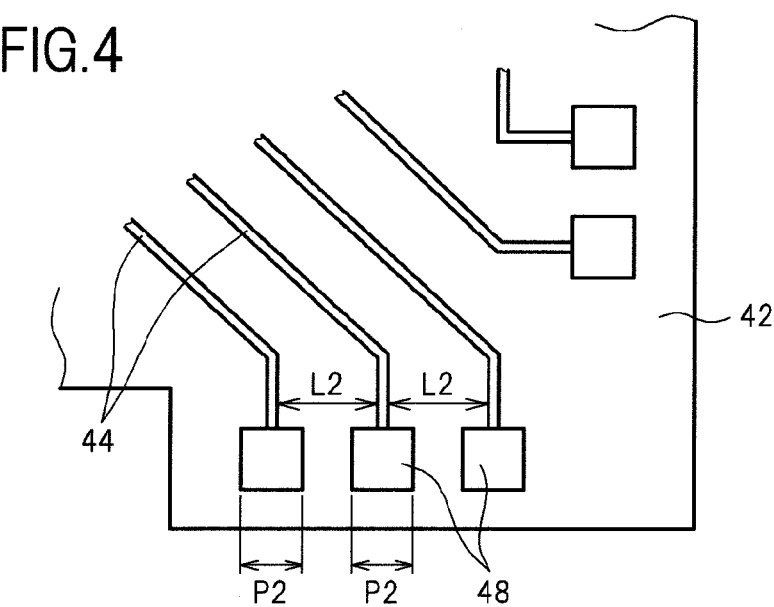
FIG. 4 is an enlarged view of a part "A" in FIG. 2.
Figure 5:
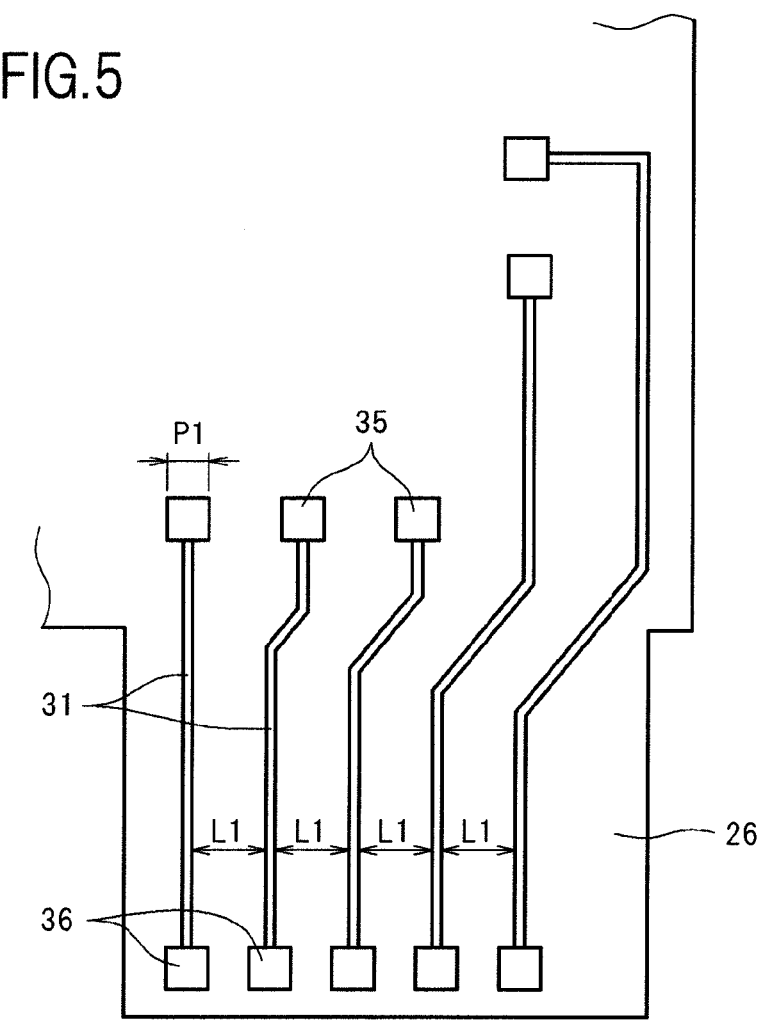
FIG. 5 is an enlarged view of a part "B" in FIG. 2.

FIG. 4 is an enlarged view of a part "A" in FIG. 2. FIG. 5 is an enlarged view of a part "B" in FIG. 2. As shown in FIGS. 2, 4, and 5, a plurality of first wirings 31 and the plurality of second wirings 44 have portions which face each other. A first (one) connection terminal 35 and the third (the other) connection terminal 36 are disposed at the respective ends of each of the first wirings 31. A second connection terminal 48 is disposed at an end of each of the second wirings 44. The second connection terminals 48 are connected to the first (one) connection terminals 35 of the first wirings 31 by solder 46, for example.

In the present embodiment, as shown in FIGS. 4 and 5, a pitch L2 of the plurality of second wirings 44 and a pad size P2 (pad width) of the second connection terminals 48 connected to the second wirings 44 are configured to be larger than a pitch L1 of the plurality of first wirings 31 and a pad size P1 of the first connection terminals 35 connected to the first wirings 31, respectively. Due to such a configuration, the first connection terminals 35 of the first flexible wiring board 26 can be electrically connected to the second connection terminals 48 of the second flexible wiring board 42 even when a small positional shift occurs. Moreover, an integrated circuit chip 50 and an electronic component 52 for controlling the touch panel 22 are mounted on the second flexible wiring board 42 in a state of being electrically connected to the second wirings 44.

Figure 6:
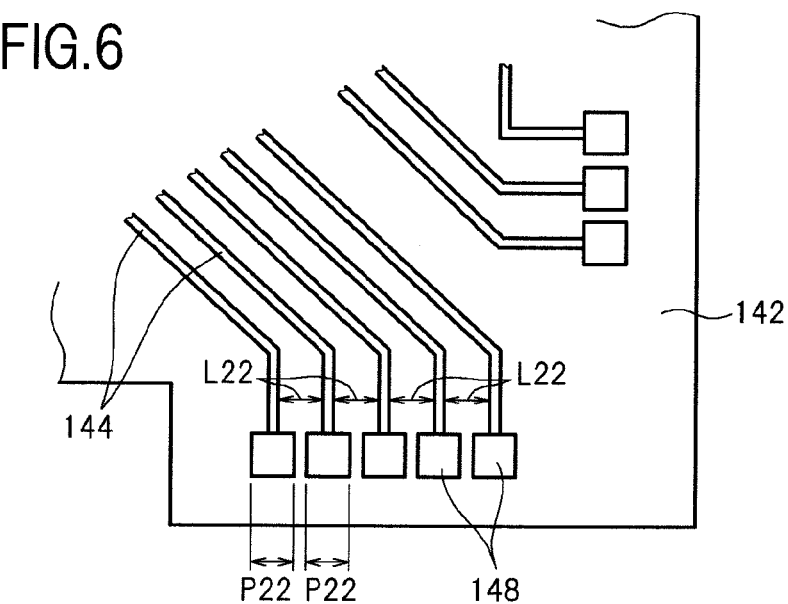
FIG. 6 is a view showing a modification of the structure shown in FIG. 4.
Figure 7:
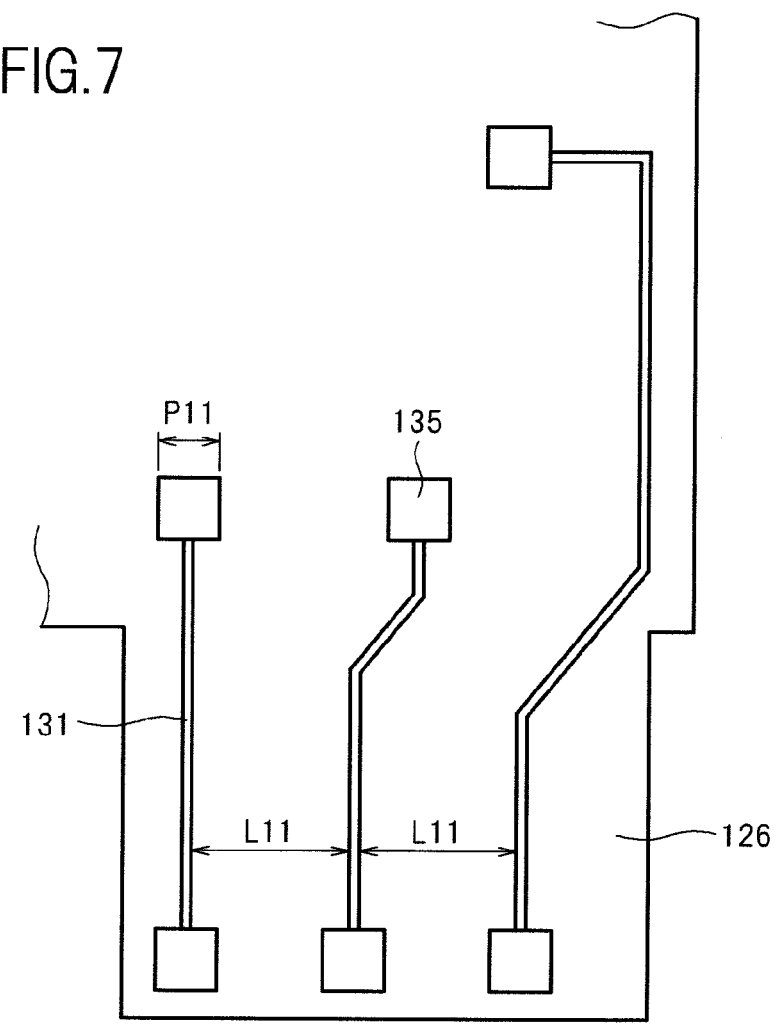
FIG. 7 is a view showing a modification of the structure shown in FIG. 5.

As a modification, as shown in FIGS. 6 and 7, a pitch L11 of first wirings 131 on a first flexible wiring board 126 and a pad size P11 of connection terminals 135 connected to the first wirings 131 may be configured to be larger than a pitch L22 of second wirings 144 on a second flexible wiring board 142 and a pad size P22 of second connection terminals 148 connected to the second wirings 144. In this case, the same advantages can be obtained.

Moreover, as shown in FIG. 2, the plurality of interface terminals 34 are electrically connected to one of the display panel 10 and the touch panel 22 through the third wirings 28 (in the present embodiment, the interface terminals 34 are electrically connected to the display panel 10). The plurality of third connection terminals 36 are electrically connected to the other of the display panel 10 and the touch panel 22 through the plurality of first wirings 31 and the plurality of second wirings 44 (in the present embodiment, the third connection terminals 36 are electrically connected to the touch panel 22).

According to the present embodiment, since the plurality of third connection terminals 36 electrically connected to the plurality of second wirings 44 are provided to the first flexible wiring board 26, there is no positional shift between the plurality of interface terminals 34 and the plurality of third connection terminals 36. Therefore, it is easy to connect the first and second flexible wiring boards 26 and 42 together to the connectors or probe pins (not shown) of an inspection device.

As shown in FIG. 3, the display device includes a light-permeable cover 54. The cover 54 is made from acryl or glass. The cover 54 has a printed layer 56. Specifically, the printed layer 56 is formed in a frame shape such that it is formed in a portion of the cover 54 other than a center portion thereof so as to surround the center portion.

The cover 54 has the printed layer 56 on a surface facing the display panel 10. Although the display surface of the display panel 10 is covered by the light-permeable cover 54, the display region is disposed on the inner side of the printed layer 56. Since the touch panel 22 is disposed between the cover 54 and the display panel 10, the cover 54 is attached to the touch panel 22 by an adhesion layer 58. The adhesion layer 58 is transparent. The adhesion layer 58 is attached to the touch panel 22 and the cover 54.

The present invention is not limited to the embodiment described above but can be modified in various ways. For example, the configurations described in the embodiment can be substituted with substantially the same configurations, configurations capable of achieving the same operations and effects, or configurations capable of attaining the same object.

What is claimed is:

1. A touch panel-attached display device including a display panel and a touch panel disposed so as to overlap with the display panel,
   the display panel being connected to a first flexible wiring board on which a plurality of first wirings are arranged,
   the touch panel being connected to a second flexible wiring board on which a plurality of second wirings are arranged,
   the plurality of second wirings of the second flexible wiring board being connected to second connection terminals,
   the plurality of first wirings of the first flexible wiring board being connected to first connection terminals,
   the first connection terminals and the second connection terminals being electrically connected to each other.

2. The display device according to claim 1,
   wherein the spacing of the plurality of second wirings is larger than the spacing of the plurality of first wirings, and
   wherein the pad size of the second connection terminals is larger than the pad size of the first connection terminals.

3. The display device according to claim 1,
   wherein the spacing of the plurality of first wirings is larger than the spacing of the plurality of second wirings, and
   wherein a pad size of the first connection terminals is larger than a pad size of the second connection terminals.

4. The display device according to claim 1,
   wherein the first flexible wiring board further includes third connection terminals which are electrically connected to the first connection terminals.

5. The display device according to claim 1,
wherein the first flexible wiring board further includes interface terminals which are electrically connected to the display panel.

6. The display device according to claim 4,
wherein the first flexible wiring board further includes interface terminals which are electrically connected to the display panel.

7. The display device according to claim 6,
wherein the number of the interface terminals is larger than the number of the third connection terminals.

8. The display device according to claim 6,
wherein a base of the first flexible wiring board includes two convex portions in top view, the interface terminals being formed on one of the convex portions, and the third connection terminals being formed on the other convex portion.

9. The display device according to claim 7,
wherein a base of the first flexible wiring board includes two convex portions in top view, the interface terminals being formed on one of the convex portions, and the third connection terminals being formed on the other convex portion.

10. The display device according to claim 9, further comprising an electronic component which is mounted on the first flexible wiring board so as to be electrically connected to the display panel.

* * * * *